(12) United States Patent
Lanham et al.

(10) Patent No.: US 7,555,450 B2
(45) Date of Patent: *Jun. 30, 2009

(54) PROCESS FOR SEEKING AUTHORIZATION FOR PRESENT RECEIPT OF LEGAL TENDER AND ASSOCIATED SYSTEM

(75) Inventors: Timothy S. Lanham, Fort Collins, CO (US); Jeffery T. Ricker, Steamboat, CO (US); Brant A. Gluth, Fort Collins, CO (US); C. Michael Crosiar, Loveland, CO (US); John M. Baughman, Fort Collins, CO (US)

(73) Assignee: Alternative Financial Solutions LLC, Fort Collins, CO (US)

( * ) Notice: Subject to any disclaimer, the term of this patent is extended or adjusted under 35 U.S.C. 154(b) by 60 days.

This patent is subject to a terminal disclaimer.

(21) Appl. No.: 11/712,286

(22) Filed: Feb. 27, 2007

(65) Prior Publication Data
US 2007/0156577 A1 Jul. 5, 2007

(51) Int. Cl.
G06Q 40/00 (2006.01)
(52) U.S. Cl. .............................. 705/35; 705/38; 705/79
(58) Field of Classification Search .............. 705/10–45
See application file for complete search history.

(56) References Cited

U.S. PATENT DOCUMENTS 4,649,832 A * 3/1987 Hain et al. ................. 109/24.1
5,239,462 A * 8/1993 Jones et al. .................... 705/38

(Continued)

OTHER PUBLICATIONS

Sheila O'Henry, "Can Supermarket Banking Achieve Super Success?", The Automated Banker, Bankers Monthly Oct. 20-23, 1991.*

(Continued)

Primary Examiner—Frantzy Poinvil
(74) Attorney, Agent, or Firm—Macheledt, Bales & Heidmiller LLP

(57) ABSTRACT

A process and system for seeking authorization for present receipt of legal tender in a requested amount, including: receiving an input entered through a user interface, the input comprising a value for the requested amount (encoded information from an identification item may also be read); transmitting the input over a data transfer pathway to a remote processor; automatically determining whether authorization of the requested amount, or a lesser amount, is granted; and if authorization is so granted, reading indicia information on a post-dated draft item for a sum total equal to at least an authorized amount plus a fee (if a draft item is being used for the present receipt of tender), and automatically providing an article for use to effectuate the present receipt of the legal tender in this authorized amount. The indicia information is also preferably transmitted over the data transfer pathway. An intermediary may be employed in the process. The input value may be less than an amount due a requester at a later date from a payor according to a current arrangement in effect between the requester and the payor (e.g., an employment arrangement); and in this case, a transmission of information to the payor can be included in the process to direct that a payment be made to the intermediary on the later date. Also, a program code on a computer readable storage medium for seeking authorization for present receipt of legal tender in a requested amount.

19 Claims, 9 Drawing Sheets

U.S. PATENT DOCUMENTS

| | | | | |
|---|---|---|---|---|
| 5,241,620 A | * | 8/1993 | Ruggiero | 706/16 |
| 5,870,721 A | * | 2/1999 | Norris | 705/38 |
| 5,930,778 A | * | 7/1999 | Geer | 705/45 |
| 6,012,048 A | * | 1/2000 | Gustin et al. | 705/39 |
| 6,105,007 A | * | 8/2000 | Norris | 705/38 |
| 6,233,566 B1 | * | 5/2001 | Levine et al. | 705/36 R |
| 6,304,860 B1 | * | 10/2001 | Martin et al. | 705/43 |

OTHER PUBLICATIONS

"Automated Loan Machine Technology Brings About New Era of Automation in Banking", http://www.prweb.com/releases/1997/prweb1974.htm, Oct. 1997.*

* cited by examiner

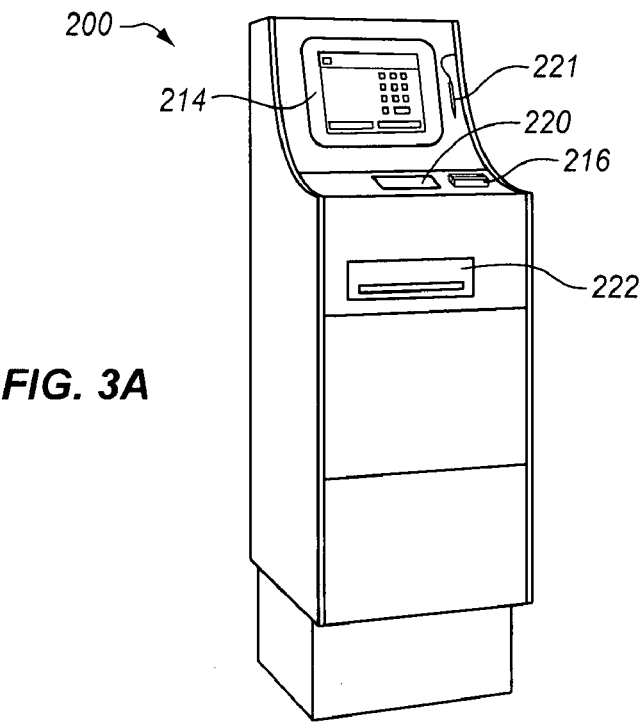
FIG. 3A
FIG. 3B
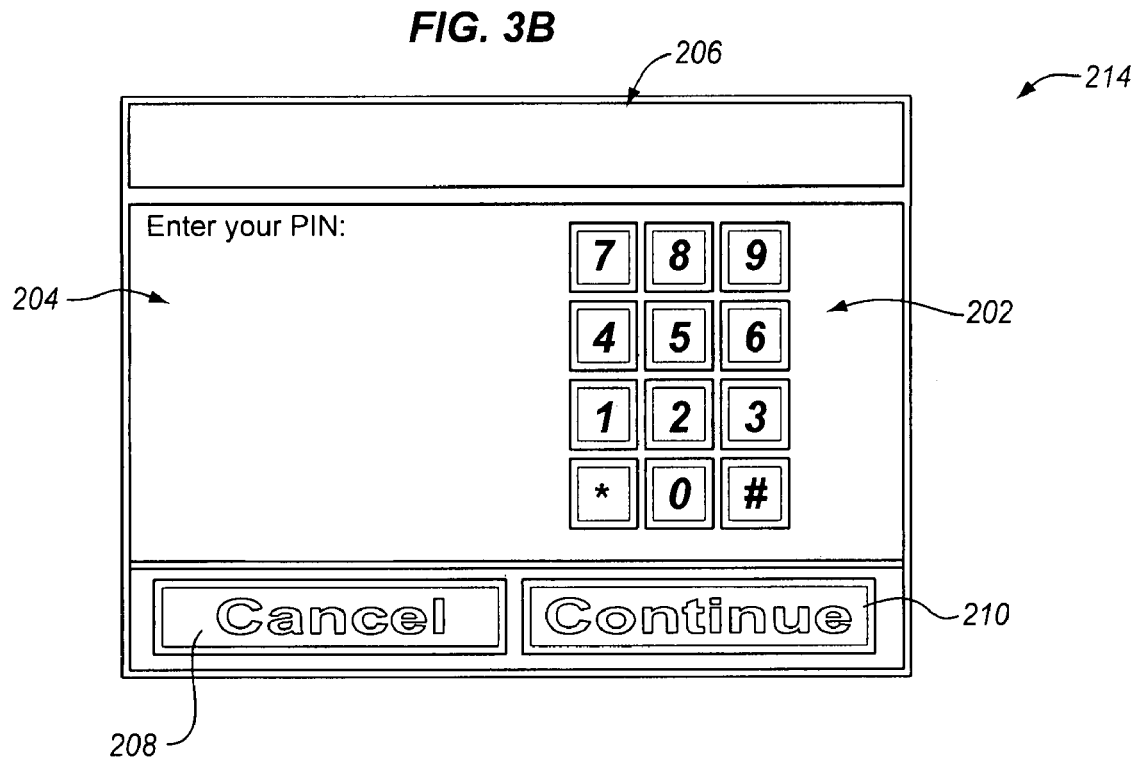

DISCLOSURE STATEMENT

National Bank

| Annual Percentage Rate | Finance Charge | Amount Financed | Total of Payments |
|---|---|---|---|
| (The cost of your credit as a yearly rate) | (The dollar amount the credit will cost you) | (The amount of credit provided to you on your behalf) | (The amount you will have paid after you have made all payments as scheduled) |
| 460.68% | $17.67 | $100 | $117.67 |

Your Payment Schedule Will Be:

| Number of Payments | Amount of Payments | When Payments Are Due |
|---|---|---|
| ONE (1) | $117.67 | 5/18/00 |

Prepayment: If you pay off early, you will not have to pay a penalty, and you will not be entitled to a return of the finance charge.

Itemization of the Amount Financed: $100
Amount Given to you
$ 100    Directly
$ 0.00   Amount Paid on Your
         Account For value received, I promise to pay the Creditor named above, when due the amount shown in the "Total of Payments" box above.

Returned Check Agreement: I/We agree to pay an amount of $ 15.00 if my check(s) is/are returned insufficient funds or closed account.

I understand and authorize ... will Debit (ACH) my personal checking account for the amount of $117.67 on 5/18/00

If my check is not negotiable at the time it is presented against my account, I hereby authorize (cross application for the amount of the check, plus any all service charges, collection and attorney fees. I do authorize

*Sample*
Customer Signature On File

TO RECEIVE YOUR $150.00
TAKE THIS RECEIPT TO THE
SERVICE COUNTER

Contract#:
Date : 05/04/2000
Store Location:
Customer Name :
SSN# :

*APPROVE*

Service Representative Verify:
__ Customer Name
__ ID #
__ Check Number:
__ Check Date: 5/18/00
__ Check Amount: $176.50
__ Confirm Check Signature
   and ID Signature Match

PAY CUSTOMER: $150.00

*****************************

CUSTOMER PLEASE SIGN BELOW TO
ACKNOWLEDGE YOU RECEIVED:
$150.00

X *Sample*
Customer's Signature

PROCESS FOR SEEKING AUTHORIZATION FOR PRESENT RECEIPT OF LEGAL TENDER AND ASSOCIATED SYSTEM

This patent application claims priority to pending U.S. patent application Ser. No. 09/587,400 filed 5 Jun. 2000 on behalf of a predecessor entity of the assignee hereof, as evidenced by full transfer, in writing.

BACKGROUND OF THE INVENTION

In general, the present invention relates to the use of a computerized communication device to seek automatic authorization of a right to receive payment of currency after biographical type information about a user has been input. More particularly, the invention relates to a novel technique and associated system for seeking authorization for present receipt of legal tender in a requested amount after receiving input (including the requested amount) entered, preferably by a requestor (who may or may not be the one who manually interacts/inputs information, and may or may not directly benefit from any legal tender received), through a user interface. The technique and system incorporate a feature for automatically determining whether authorization of the requested, or a lesser, amount is granted (prior to determining this, however, encoded information from an identification item, such as an ID card, may be required); and if so granted, an article for use to effectuate the present receipt of the legal tender in the authorized amount is automatically provided. Further, if authorization is granted for an authorized amount, then (A) indicia information from a post-dated draft item (such as a check) is read, and on the post-date of the draft item, a debit equal to the sum total (including the authorized amount plus a fee) is automatically made to an open account associated with the draft item; or (B) an intermediary can be engaged to effectuate the present receipt of legal tender in an amount that is less than an amount due a requester at a later date from a payor under an arrangement in effect between the requestor and the payor (e.g., an employment arrangement), and thereafter, information can automatically be transmitted to the payor directing that a payment be made on the later date of a sum total equal to at least the authorized amount plus a fee.

Unlike known manual methods of cashing post-dated checks or providing payroll or other cash advances, the ingenious technique and associated system of the invention incorporate a computerized apparatus (whether of a large or small footprint, desktop, floor, or room model, etc.) designed for portability, yet suitably anchored for use, which has been programmed to communicate with at least one remote processor interconnected with at least one network, including a LAN (local area network), a privately accessible WAN (wide area network), the publicly accessible WAN known as the Internet global information network, or any suitable interconnected system of processors for carrying out the features.

Background Reference Information

I. The Internet and Digital Computers. The Internet is a massive world-wide "network of networks" comprised of tens-of-thousands of smaller regional networks, that interconnects computerized devices of many various types and sizes (palmtop/handhelds, notebook-sized, desktops, cellular-modem message/pager devices, workstation, main-frames, etc.) allowing users of the computerized devices access to information stored around the world. Although other types of computers are undergoing development, such as computers using biological processors, digital computers (including personal computers, PCs, of any make or model) are by far the most common type currently used. The software applications that run on a digital computer are controlled by an operating system (OS). An OS performs various operations including: job management (coordinating the running of programs); provides the interaction between a user and the OS; device management (translating data to and from different input and output devices); data management (regulating data storage in memory and other storage media); task management (allocating tasks, especially in multitasking computers, for concurrent operation of one or more jobs/programs); and system security (precluding unauthorized users from access to the OS). One type of OS, for example, the powerful UNIX workstation operating system allows many users and many different programs to concurrently utilize available processor(s). This type of multi-user, multi-processing networking technology/protocol is the foundation of the Internet operations.

II. Modems. A user may access the Internet directly through a computer connected to a modem which is, in turn, interconnected to the Internet. Modems (modulator-demodulators) are input-output devices that translate back and forth between digital and analog communications. Modems allow computers (digital communicators) to "talk" to each other via a phone line (typically, an analog communicator). A modem on a computerized device at one end of a transmission line translates digital pulses into transmittable signals (such as analog signals/sound) for transmission to another, remotely-located computer through a fiber-optic or coaxial cable, telephone line/cable, or other remote-connection communication network (including a cellular satellite network). A modem connected to a computerized device at the other end of the transmission line reverses the process so that the data can be read.

III. The world-wide-web ("www"). While the word 'Internet' generally refers to the multi-functional aspects of the communications medium/global network, "www" is used to describe the abstract space of knowledge, commonly 'web-space', on the Internet. The www works under the popular network computer model known as "client-server". A www server (or, web server) is a program running on a computer whose purpose is to serve documents or digital information to other computers upon request. A www (or 'web') client is a program generally run on the user's (client) computer so that the user can request digital information from the server (for example, browsers are considered web clients). Web servers are most-often remotely located from the computerized equipment running a web client. 'Remote' as used in connection with the www, or any private/controlled WAN, can mean hundreds-of-thousands of miles away, or simply upstairs in the same building (but interconnected to some type of local or global network).

IV. A Common Language. One popular communications protocol used by www clients and servers for purposes of communication is the Hyper Text Transfer Protocol (HTTP). All web clients and servers must be able to speak a common computer language in order to send and receive documents. Hence, web servers are often simply called HTTP servers. The standard format used for creating and recognizing hypermedia documents, or 'web pages', is the Hyper Text Markup Language (HTML). HTML is derived from another document formatting language used widely in publishing known as Standard Generalized Markup Language (SGML). The File Transfer Protocol (FTP) is one simple way to exchange files between computers on the Internet. Like HTTP (which transfers displayable web pages and related files) and the Simple Mail Transfer Protocol (SMTP which transfers e_mail), FTP is a standard communications protocol that uses Internet Protocol (IP). FTP is commonly used to transfer web page files from their creator to the computer that acts as their server. FTP is also commonly used to download programs and other files to a user's computer from FTP servers located at other locations.

V. FAXing and Hard-copies. If one wishes to receive a document transmitted over a phone network (whether fiber-optic or coaxial cable, satellite cellular transmission, and so on) or via microwave relay, a facsimile machine (hereafter "FAX") or a FAX program operational on a processor in communication with a printing device, may be employed. The word facsimile refers to a process, system, or apparatus for reproducing hardcopy material at a distance. A drawing, page of text, or picture is scanned by a light-sensitive device to produce an electric signal which is typically sent through a phone network. In most earlier systems, the signal is an analog of the brightness of the graphic material being scanned. More sophisticated machines/software generate digital signals-streams of ones and zeros—that are coded and compressed versions of the analog signal. Solid-state technology allows FAX machines to utilize miniature photo-sensitive arrays to take an electronic snapshot of a document. Stand-alone FAX machines generally reproduce the received FAX-copy by employing photographic, electricity-sensitive, and thermal (heat-sensitive) paper. If the FAXed document is sent directly through a modem and into a PC's memory, for example, later reproduction of the document in memory can be done by any type of printer connected to the PC. There are many types of printers that can create a hardcopy of a document that has been received and placed in computer memory: daisy-wheel, dot-matrix, laser, ink-jet printers, and thermal printers.

VI. Financial Transactions Area. Financial institutions include organizations authorized to do business under applicable laws such as banks and trust companies, savings and loan companies or associations, building and loan associations, credit unions, and so on. Cash and payroll advances can be made by entities, including financial institutions. A check is a draft drawn on a bank or other financial institution and payable on demand but no earlier than its stated date (whether the stated date is after its issue date), signed by the maker or drawer—it contains an unconditional promise to pay a sum certain (as stated) in currency to the order of the payee. Thus, as is known, a draft is a demand for payment signed/authorized by the maker (employing suitable means, e.g., electronically, pen-and-ink, stylus, and so on), whether made electronically, on paper (hardcopy), with 'plastic' (credit card), and so on. A postdated check, also known as a delayed or deferred deposit, bears a later stated date, which is generally a date after its issue date. The negotiability of a postdated check is not affected by being postdated—it is simply payable on its (later) stated date. Thus, as is known, a postdated draft item is a demand for payment on a date after the draft has been issued (i.e., made/executed). In general, when an individual applies for a checking account with a financial institution, very little (if anything) to determine creditworthiness of the applicant is done prior to creating and opening the account. One's creditworthiness, as viewed by lenders, hinges on the willingness and ability to repay a debt—having good credit means that, if one has an obligation to pay (car payment, credit card balance, rent, utilities, and so on), one pays it when due, every time and has the means to do so. By way of review, as is well known: Willingness means that the individual has accepted the responsibility of paying back his/her obligation and it is done on time, every time (this is a subjective analysis often hard to predict); whereas ability means he/she has sufficient funds to do so (it is an objective determination). Therefore, since minimal background analysis is done prior to opening a checking account, and for other reasons, the acceptance of payment by check is often risky.

VII. Postdated Checks/Deferred Deposits. In the event the maker (this could be a human or an 'artificial person', i.e. a business legal entity) of a draft (whether made via electronic, paper, or other means) does not have sufficient funds to cover the payment of the stated sum certain on the date of issuance (i.e., date made), it might choose to write a postdated draft. One who seeks to defer his/her/its payment on a check written in an effort to receive currency, presently, can write a postdated check (deferred check cashing); this is sometimes called obtaining 'payday cash'. Any party or entity that accepts such a postdated check as a promise to repay payday cash advanced in this manner to the maker of the postdated check, takes on even greater risk of nonpayment. Nevertheless, the acceptance of postdated checks/draft items as an unconditional promise to pay is a legitimate way to obtain currency and it is important to maintain the payday cash as an alternative, viable means for doing so. Not only can individuals ('natural persons') benefit from having access to systems capable of automatically authorizing requests for currency (usable as legal tender) to meet present needs therefor, but so can other recognized legal entities (so called 'artificial' or 'non-natural' persons, whether not-for-profit or commercial enterprises).

VIII. Payroll Advances. It is not uncommon for an employee, subcontractor, or other agent of another to seek an advance on his/her/its paycheck or other compensation or royalties owed under an arrangement. Depending upon the particular arrangement giving rise to the obligation of future payment, these advances might be called 'payroll advances', cash advances, advance on commission, conditional payments, retainers, and so on. In the case of a payroll advance, the agent (employee, subcontractor, etc.) requests the advance directly from the payor (such as the employer or contracting entity ultimately responsible for payment) who then makes the advance by way of producing a draft issued for payment on demand anytime on or after the date of issue. Alternatively, the payor may simply advance currency and deduct the sum advanced from a future payment (s) due the agent.

IX. Novel Technique and System of the Invention. As is well known by those responsible for the laborious administrative and financial tasks of processing, processes to cash postdated checks, make payroll advances, or authorize other types of transaction requests to provide payday cash to an individual, or other legal entity, are highly labor intensive. All labor-intensive processes are subject to potential human error. The cashing of postdated checks for the purpose of receiving currency on the date of issuing the check, carries with it a certain amount of additional financial risk, as is the advancing of a portion or all of a sum due at a later date (such as any payment conditional upon finishing the work week or completing a job). Therefore, a cost-efficient, less labor-intensive and less error-prone process of, and system for, seeking authorization for present receipt of legal tender—preferably to include a reduction in overall financial risk—are needed. And unlike any manual process currently in use, the invention includes the automatic providing, if authorization is so granted, of an article for use to effectuate the present receipt of the legal tender (this article can be in the form of a script, an encoded card or strip, a money order, a traveler's check, currency or other medium of exchange whether made electronically, and so on).

SUMMARY OF THE INVENTION

It is a primary object of this invention to provide a process and associated system for seeking authorization for present receipt of legal tender in a requested amount after receiving input (including a value for the requested amount) entered through a user interface. Also included is a feature for automatically determining whether authorization of the requested, or a lesser, amount is granted (encoded information from an identification item may be required for this); and if so granted, reading indicia information from a post-dated draft item (such as a check) if appropriate, and automatically providing an article for use to effectuate the present receipt of the legal tender in the authorized amount. Further, if the authorization is so granted and as applicable, (A) on the post-date of the draft item, a debit equal to the sum total of at least the requested amount plus a fee is automatically made to an open account associated with the draft item (such as an account maintained at a bank, credit union, or other financial institution, a credit/debit card company, through a clearing house having access to funds of a financial institution, and so on); or (B) an intermediary may be engaged to effectuate the present receipt of the legal tender in an amount that is less than an amount due a requestor at a later date from a payor under an arrangement in effect between the requestor and the payor, and thereafter, information can automatically be transmitted to the payor directing that a payment be made on the later date of a sum total equal to at least the authorized amount plus a fee.

This system and method utilizes a unique, yet simplified, computerized technique to automatically read, receive and transmit data back and forth to allow for an automatic authorization and if given, automatically providing an article for use to effectuate the present receipt of the legal tender in the authorized amount; and further, to direct payment in return therefor in an amount of the authorized amount plus a fee. Both the process and associated system have been designed for user-friendly operation and for ready access to currency, scrip, or other document, ticket, stamp, card, or medium of exchange further entitling the holder to receive something of value (whether cash, some privilege, or item). As one can appreciate, within the spirit and scope of design goals contemplated hereby, the new computerized authorization system and associated process for seeking authorization for present receipt of legal tender in a requested amount are operable with a wide range of computer operating systems (most notably UNIX, LINUX, MS-DOS™-, MS WINDOWS™-, and MACINTOSH®-compatible) and a wide range of computer network environments whether used over a local area network (LAN), a wide area network (WAN) including one that accommodates phone transmission, HTTP, microwave relay, etc. or within a single processor. The innovative process and system offer a unique combination and process flow of mechanisms for seeking such automatic authorization.

The new process and associated system were developed to more efficiently provide an avenue of automatic authorization for a myriad of different types of requests by users for legal tender, while at the same time reduce financial risk associated with such advances. Unlike the labor-intensive processes currently available, the new system and process require much less human intervention by a payor, intermediary, or cashing entity to determine whether outstanding and unpaid checks exists, determine whether to authorize an advance and to what extent, as well as automate steps to be reimbursed and paid for the advance.

Although the advantages of providing the novel, flexible process and associated system and program code of the invention, as described herein, will be more-fully appreciated in connection with the full specification, certain advantages are listed as follows:

(a) Product versatility—a single computerized apparatus can be used for on-site present receipt by a user of a myriad of types of legal tender in a requested amount including without limitation, currency, paper scrip, a temporary card-sized scrip-ATM or cash card with a magnetized strip, an original issue money order/travelers cheque(s) of a certain value, a phone card credited toward a certain amount of communication network use, a ski pass credited for exchange toward a certain number of days or season usage, an authorization code/indicia and/or temporary card/UPC-stamp for use as legal tender to purchase an item, an electronic file downloaded into a handheld, desktop-sized, mainframe style, or portable computerized gizmo (i.e., an electronic transfer of currency) including information of the requested amount, any document/ticket/stamp, or other medium of exchange further entitling the holder to receive something of value.

(b) Simplicity of design and use—The computerized apparatus of the invention with which a user can interface to seek authorization, can be sized for portability and installed/positioned, anchored if necessary, and removed with ease and without disruption of the outlet/store/establishment in which the apparatus is located. Furthermore, a user of the apparatus has at her/his fingertips through a user-friendly interactive interface, a panoply of types of articles to effectuate the present receipt of the legal tender in the amount requested. The specific steps taken automatically to authorize a user's transaction request are transparent to a user, who will appreciate the power and straightforward flow of the process as well as the speed with which authorization is made (if given). The use of unique two-tiered authorization techniques adds to ease of operation and maintenance.

(c) Speed and accuracy—Eliminating the need for manual authorization and presenting of the legal tender entitling the holder to receive something of value, saves time and can substantially decrease human error in the processing of requests for advances (including payday cash and payroll advances); furthermore, since authorization can be efficiently done using a unique two-tiered (objective-type analysis) approach as disclosed herein, or done by comparison with the payor's payroll or payment-due records, the accuracy of processing authorized transaction requests increases (whether such requests are made one-right-after-the-other by many different users of the apparatus).

(d) Versatility of operation—The system and method of the invention are operable with a wide range of computer operating systems and a wide range of computer network environments whether used locally (LAN) or over a world-wide network (WAN) like the Internet to transmit information and execute not only the authorization of the request, but to effectuate the present receipt of the legal tender in the amount requested and if appropriate, thereafter, analyzing indicia information read and input entered through a user interface to calculate a score, comparing encoded information read and input entered through the user interface to confirm a payor's obligation to the user/requestor, obtain a third-party guarantee (such as a check guarantor) of the sum total (including the requested amount plus a fee) of the draft item, automatically direct that a debit be made to an open account associated with the draft item, direct the payor to make a payment equal to a sum total (including the requested amount plus a fee) on the later date to an intermediary.

(e) Design flexibility—The apparatus with which a user interfaces (such as a personal computer, "PC", workstation, or other high-end client) can be programmed and/or loaded with initial data so that it may handle additional automatic tasks (which can be 'unloaded' from the remotely located server to free this remote server up for handing more transaction requests and other operations in a speedy manner). Also, the remote server or system of interconnected servers (whether or not each is independently-operational) may be readily programmed using known suitable programming tools and techniques (including subroutines, program modules, etc.).

(f) Overall cost reduction—Reducing the dependency on trained financial advisors and professional clerks to carry out each of the several meticulous data input, comparison, analysis, and authorization steps required to manually authorize (whether acting as an intermediary) transaction requests by an individual or entity for present receipt of currency, decreases the time it takes to do so, while making the process less error prone; thus, making the overall process more economically feasible.

(g) Due to the small sizes of commercially available powerful PCs with sufficient memory and storage to handle the features of the invention, an apparatus of the invention may be fabricated with a small footprint and adequate features for handy user-requester interaction (including the reading drafts of various sized and/or reading encoded information from an identification item as well as accepting electronically-stored signatures), for the providing of articles of for use to effectuate legal tender, and so on. As a result of having a small footprint, one or more of the novel interactive apparatuses may be positioned at different locations within a retail or other commercial environment (e.g., a mall, grocery store, airport, bus or train station, amusement park, office building, employer's facility, apartment building, condominium complex, and so on) and operated simultaneously allowing customers, shoppers, maintenance workers, office workers, employees, tenants, invitees, ready access to a myriad of types of legal tender requests.

(h) Ready implementation of invention—off the shelf programs to control components of the computerized apparatus, along with web servers and associated interface protocols, communication protocols and security functionality, existing telecommunications cable/links, and equipment to scan and produce hard copies of documents, may be utilized in carrying out the features of the invention.

Briefly described, once again, the invention includes a process for seeking authorization for present receipt of legal tender in a requested amount. The process includes: receiving an input entered through a user interface, the input comprising a value for the requested amount (encoded information from an identification item may also be read); transmitting the input over a data transfer pathway to a remote processor; automatically determining whether authorization of the requested amount, or a lesser amount, is granted; and if authorization is so granted, reading indicia information on a post-dated draft item for a sum total equal to at least an authorized amount plus a fee (if a draft item is being used for the present receipt of tender), and automatically providing an article for use to effectuate the present receipt of the legal tender in this authorized amount. The indicia information is also preferably transmitted over the data transfer pathway. An intermediary may be employed in the process. The input value may be less than an amount due a requester at a later date from a payor according to a current arrangement in effect between the requestor and the payor (e.g., an employment arrangement); and in this case, a transmission of information to the payor can be included in the process to direct that a payment be made to the intermediary on the later date of the sum total.

Further characterized is a system for seeking automatic authorization for present receipt of legal tender in a requested amount. The system includes a reader and a user interface in communication with a data transfer pathway and a remote processor, and (if a draft item is being used for the present receipt of tender) a post-dated draft item having indicia information comprising a value for a sum total equal to at least an authorized amount plus a fee. The data transfer pathway is utilized to transmit an input (comprising a value for the requested amount) entered through the user interface, as well as any indicia information read, to the remote processor for analysis to determine whether authorization of the requested, or a lesser, amount is granted. Also included is a mechanism for providing an article for use to effectuate the present receipt of the legal tender in the authorized amount, in the event authorization is granted. In a system for seeking such authorization from an intermediary, a reader can be used for reading encoded information from an identification item where the input value is preferably less than an amount due a requestor at a later date from a payor according to a current arrangement. The remote processor can be utilized for comparing the input and any encoded information read, to determine whether authorization of the requested, or a lesser, amount is granted.

Also characterized is a computer executable program code on a computer readable storage medium for seeking authorization for present receipt of legal tender in a requested amount. The program code comprises: a first program sub-code for receiving an input (comprising a value for the requested amount) entered through a user interface and transmitting the input over a data transfer pathway to a remote processor; a second program sub-code for automatically determining whether authorization of the requested amount, or a lesser amount, is granted; and a third program sub-code for, if said authorization is so granted, reading indicia information on a post-dated draft item for a sum total equal to at least an authorized amount plus a fee, and automatically providing an article for use to effectuate the present receipt of the legal tender in this authorized amount. The third program sub-code can further comprise instructions for automatically directing that a debit equal to the sum total be made, if authorization was so granted, on the post-date to an open account associated with the draft item. The authorization for present receipt of tender may be sought from an intermediary, wherein the first program sub-code includes instructions for reading encoded information from an identification item and for receiving an input entered through a user interface, the input value being less than an amount due a requester at a later date from a payor—the third sub-code further comprising instructions for transmitting information to the payor directing that a payment be made, if authorization was granted, on the later date of a sum total equal to at least the authorized amount plus a fee.

BRIEF DESCRIPTION OF THE DRAWINGS

For purposes of illustrating the flexibility of design and versatility of the innovative process and system (including novel additional features), the invention will be more particularly described by referencing the accompanying drawings of embodiments of the invention (in which like numerals designate like parts). The figures have been included to communicate features of the innovative process and system of the invention by way of example, only, and are in no way intended to limit the disclosure hereof.

FIG. 3A is an isometric of a computerized apparatus of the invention and

FIG. 3B is an illustration of a screen display of a user interface of the apparatus in FIG. 3A.

FIG. 4A is an illustration of a sample DISCLOSURE including terms of acceptance that may be made by a requestor of the present receipt of tender, and FIG. 4B is a sample script that may be used to effectuate the present receipt of the tender in an authorized amount.

DETAILED DESCRIPTION OF THE ILLUSTRATED EMBODIMENTS

Figure 1:
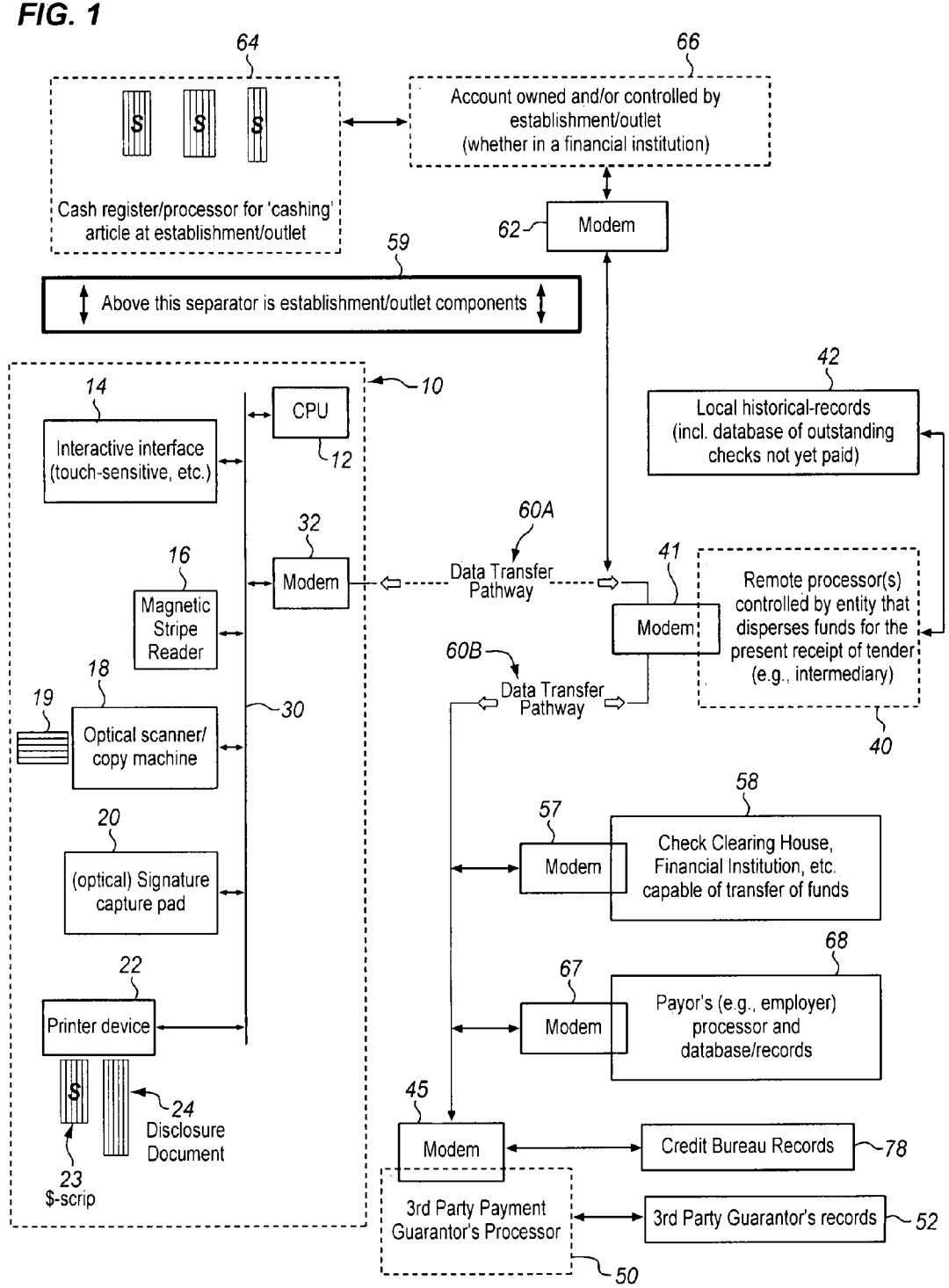
FIG. 1 illustrates example features of a preferred system of the invention shown diagrammatically in block form.

FIG. 1 is a schematic block diagram of a preferred embodiment designed to service a user desiring present receipt of legal tender in a requested amount who agrees, just prior to the time of receiving a scrip or other medium of exchange 23 to effectuate the present receipt, to pay a transaction fee in addition to the principal amount requested. The user can 'cash-in' the article 23, from a nearby outlet/store or other establishment, ATM cashier, and so on, for currency or some tender equivalent for use in that outlet/store/establishment or elsewhere. Due to the novel features of the invention, a user (which, of course, may or may not receive any direct benefit from any legal tender received, and may or may not be one-in-the-same as a requestor) may be able to obtain currency or other medium of exchange, regardless of past bad credit history with a financial institution. Of course, taking on the risk of advancing currency from a post-dated draft item carries with it a transaction fee which is added to the amount that will be debited an open account associated with the draft item, on its post-date.

The FIG. 1 apparatus 10 includes a CPU (computer processing unit) outlined at 12 as well as various peripheral components, not limited to those shown, which are in communication with modem 32 and common pathway, bus 30 which as diagrammed, includes the computerized apparatus's internal/local bus as well as any peripheral buses. CPU 12 of apparatus 10 is illustrated in electrical communication with an interactive interface 14 (which may be a touch-sensitive display, keypad or full keyboard, joystick, mouse, and other suitable mechanism for accepting user input), a magnetic stripe reader 16, optical scanner 18 into which a check 19 or other such draft may be scanned/read, a signature (optical or other type) capture pad 20, and a printer device 22 (e.g., a daisy-wheel, dot-matrix, laser, ink-jet, and thermal printer) for producing a hard copy, such as a scrip 23 and disclosure document 24, at the apparatus 10.

Certain of the modems shown, namely 32, 41, 57, and 67 are preferably in communication directly in the form of a private WAN as well as accessible through the Internet (see also FIGS. 5A and 6A), and modems 62 and 45 can be interconnected solely through the Internet. An independently operable processor, or server, 40 is controlled and operated by the entity that will be providing or advancing funds to the requestor (and therefore be carrying the financial burden until reimbursed or paid) by way of present receipt of legal tender in the requested, or a lesser, amount which can be cashed-in anytime that, or another, day whether done at a cash register or other kiosk at the outlet or establishment 64 so that the requester receives currency in return for surrendering the $-scrip 23 to the outlet's cashier for cash. In the embodiment represented, once a scrip or some other article that can function as a medium of exchange is printed/output from apparatus 10 at 22, the user hand carries it to a cashier, ATM-machine or other kiosk, financial institution teller, etc. for an exchange of currency. Alternatively, device 22 may output currency for immediate exchange for value. This currency may conveniently be used in particular outlet/establishment, or elsewhere. At the end of a designated period of time such as the end of the workday, after paying out currency in exchange for several articles (e.g., script 23), an electronic transfer of funds may be made to an account owned and/or controlled by the outlet/establishment (box 66 interconnected to suitable communication device 62) by the entity (processor 40) to repay or reimburse the outlet/establishment for its total cash outlay during the prior period. Then, on the agreed, later 'stated date' of the draft item 19, processor 40 will seek payment from a check clearing house, financial institution, or other entity capable of directing or debiting the open account associated with the draft item 19 used for the current receipt of legal tender. The process illustrated in FIGS. 6A, 6B engages Payor 68 via it modem 67 for intercommunication with server 40.

Processor, or a 'bank' of interconnected processors, labeled as box 40 accesses at least one program that objectively analyzes the specific real-time input of the user/requestor (done through interface 14) to perform a step to authorize the amount requested by the user, or a lesser amount if appropriate, or simply deny the requester from receiving anything. As will be better appreciated in connection with discussion of step 108 of FIGS. 2 and 196 of FIG. 6B, processor 40 is employed to look to see if, within accessible local records (such as a database) 42, the user shows up as one who has an outstanding, and yet unpaid, transaction request such as a postdated check. If the requestor currently requesting a transaction amount has no outstanding and yet unpaid transaction request, then a statistical forecast is made by objectively analyzing to some degree the bio-type information input by the user at interface 14 (see, also, FIG. 2 at 104). This statistical forecast is made in the form of a calculated score using an algorithm (accessible to processor 40) statistically determined/analyzed for that purpose.

The modem 45 connected to the $3^{rd}$ party guarantor's processor 50 is preferably in direct communication with processor 40 via modem 41, through a suitable data transfer pathway labeled 60B (see also FIG. 5A at 360C) such as one capable of being connected and disconnected from the Internet, so that a second tier of the unique authorization system of the invention may be performed. To better allocate the financial risk involved with not ever being able to collect from an open account owned by the requester, preferably this second tier of authorization is done independently by a $3^{rd}$ party guarantor using its own scoring algorithm to assess risk of guaranteeing payment of a requested amount plus transaction fee. To do this, the $3^{rd}$ party accesses its database 52 of historical information including prior bad-check writing history of all potential users, recent odd check-writing patterns of all potential users, and so on. The $3^{rd}$ party may choose, based upon the results of its own inquiry into records 52, to further access outside records such as those identified at 78 from a credit bureau or financial institution. The automatic transmission from processor 40 to the $3^{rd}$ party 50 of OCR (optical character recognition) type data/characters extracted from a draft item 19 that had been scanned 18 and transmitted to processor 40, and the return of authorization information from the $3^{rd}$ party along the same route, can all be done while a requester is standing at or nearby interface 14. An optical character Recognition (OCR) machine performs the recognition of printed alphanumeric characters in many different OCR fonts, as well as hand printing.

Figure 2:
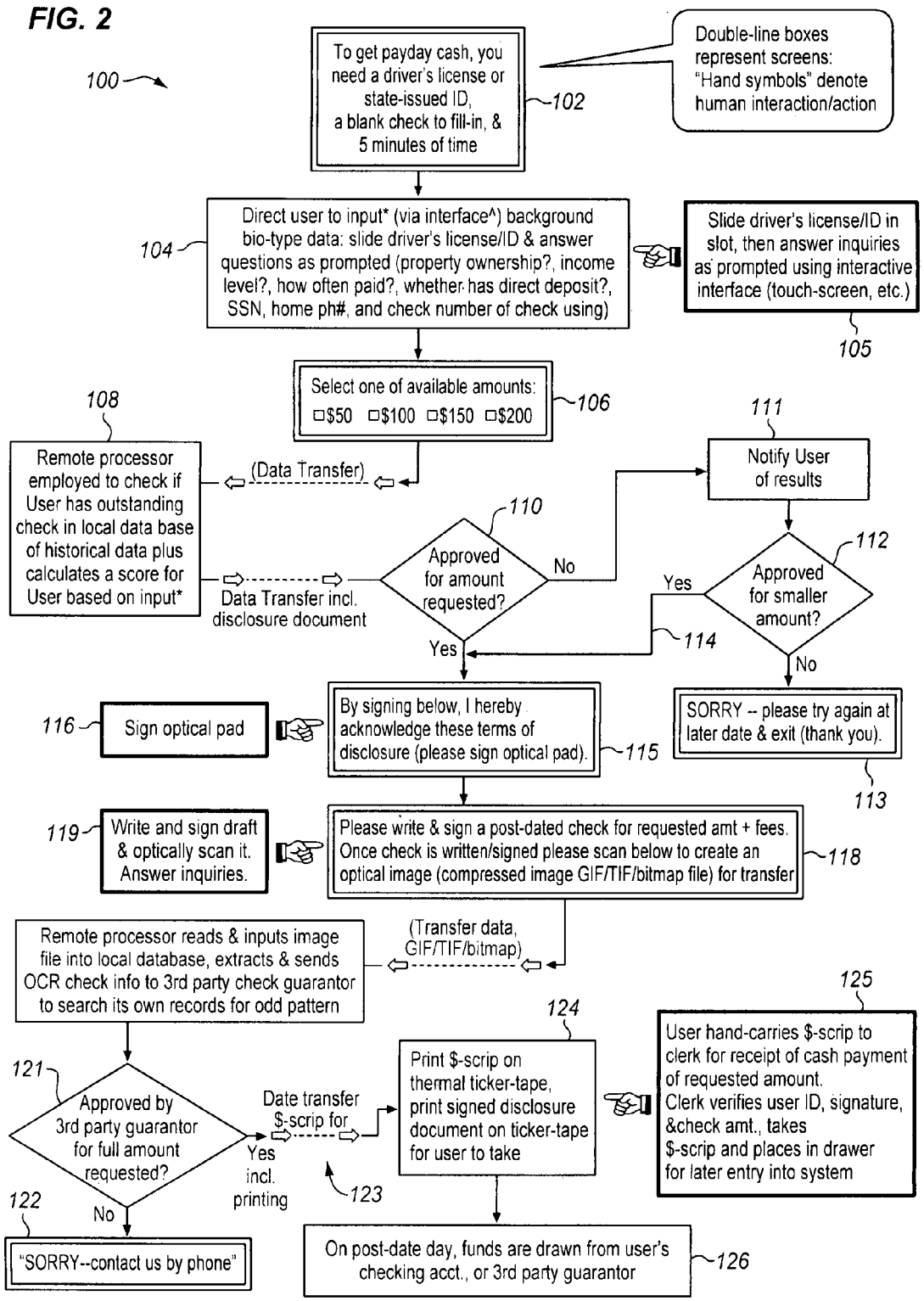
FIG. 2 is a flow diagram included for purposes of understanding overall system operation and process 100 of the invention.

The FIG. 2 diagrammatic chart depicts the flow of steps one may take to carry out a preferred embodiment of the invention for present receipt of legal tender by obtaining an article such as currency, paper scrip (see also FIG. 4B at 223), a temporary card-sized scrip-ATM or cash card with a magnetized strip, an original issue money order/travelers cheque(s) of a certain value, a phone card credited toward a certain amount of communication network use, a ski pass credited for exchange toward a certain number of days or season usage, an authorization code/indicia and/or temporary card/UPC-stamp for use as legal tender to purchase an item, an electronic file downloaded into a handheld, desktop-sized, mainframe style, or portable computerized gizmo (i.e., an electronic transfer of currency) including information of the requested amount, any document/ticket/stamp, or other medium of exchange further entitling the holder to receive something of value. One can better appreciate the simplicity of design of the new process as well as the many features of this invention that truly distinguish it from known processes to authorize check cashing and related requests from financial institutions for funds. Once a request amount has been selected and input (such as by using a touch-sensitive display 106), an objective two-part test may be performed: (1) search records to determine if the current user has any outstanding postdated checks written but not-yet-collected, and if none, then (2) using the information input via the interface at 104, calculate a score that operates as a statistical forecast using an algorithm statistically determined/analyzed for that purpose.

Beginning with box 102, a user approaching an interactive interface (such as that discussed in connection with FIG. 1 at 14) will see a screen display 102 and must, at some point, interact to engage the apparatus 10 (FIG. 1) into action. Once again, in this context as one will appreciate need not be repeated in connection with use of 'user' and 'requestor' herein: one interacting with the user interface may or may not directly benefit from any legal tender received, and may or may not have any input regarding the amount requested. The box 104 and associated note 105 describe the type of information the user may be asked to input in order to receive automatic authorization of the transaction request. Once the user selects one of several optional-available amounts 106, the processor 40 (FIG. 1) performs 108 its automatic 'first-pass' objective determination of whether the user making the financial request is likely to have funds available to pay a sum certain by a stated, or later, date (see also FIG. 5B steps 156, 158). If the first-pass determination results in an initial authorization of either the amount requested, or a lesser amount 110, 111, 112, 114 (see also, step 160 and associated note 162 in FIG. 5B) as is described in detail below, the results are remotely transmitted and communicated through the interface for the user's/requestor's affirmation of a promise to pay on or before a stated, or later, date a sum total equal to the requested amount plus a transaction fee (this may be accomplished by way of signing a capture pad, signing and scanning-in a paper document, swiping a credit/debit card, and/or other suitable means to affirm).

Figure 5A:
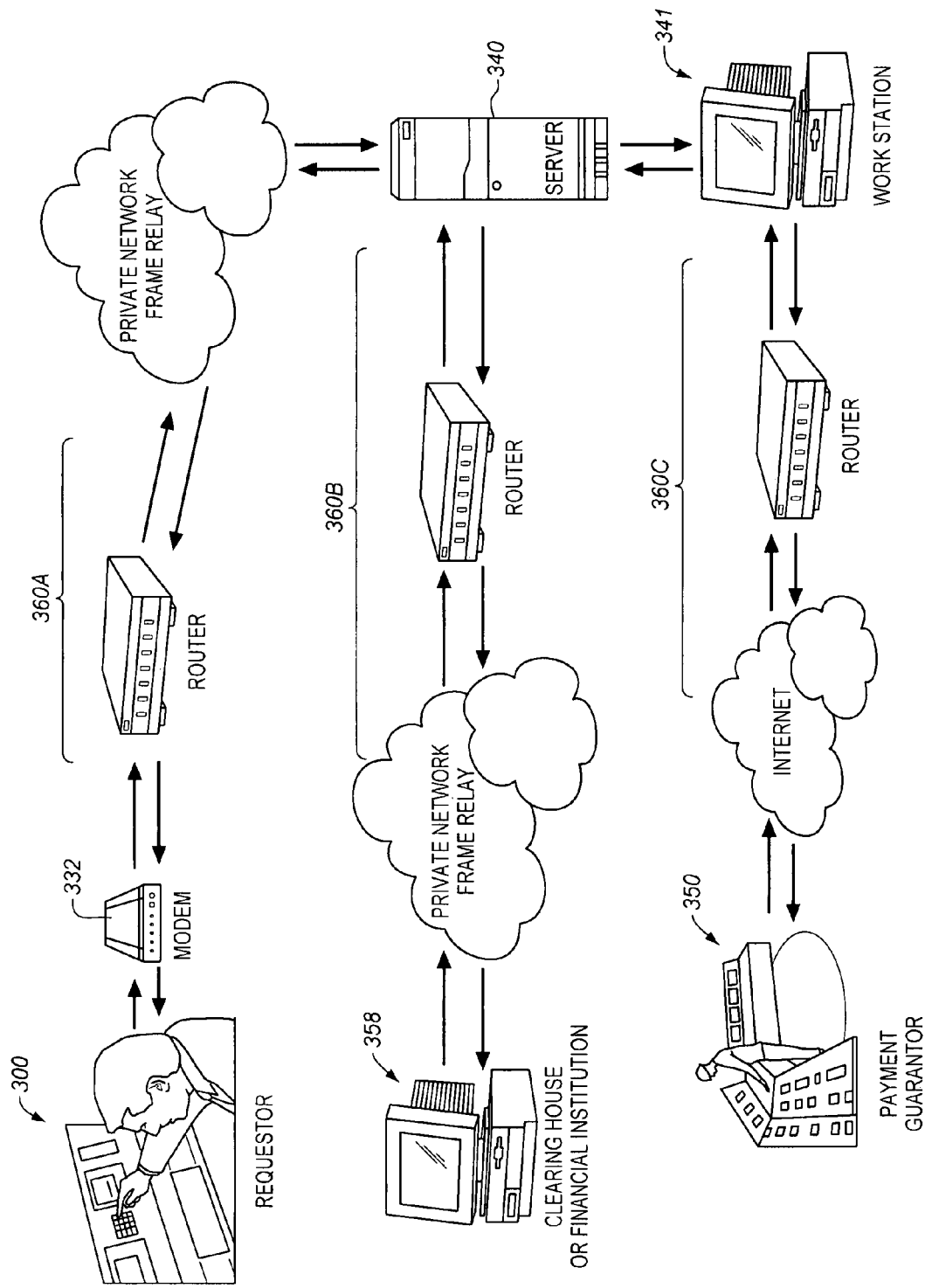
FIG. 5A diagrammatically illustrates certain hardware feature details and interconnection of components of a system of the invention, wherein a payment guarantor may be employed to provide payment guarantee.
Figure 5B:
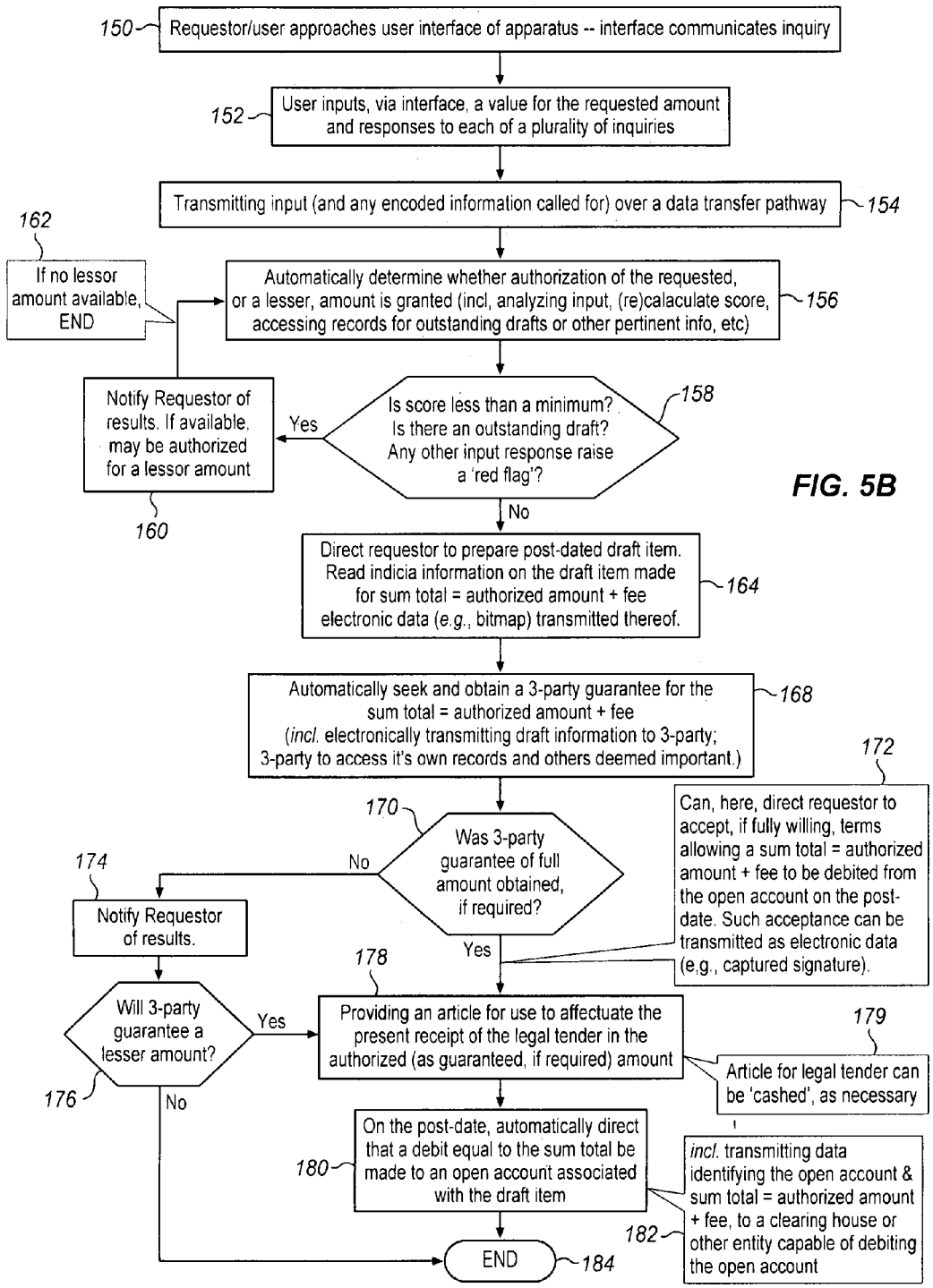
FIG. 5B is a flow diagram of process features associated with the system shown in FIG. 5A.

If not approved 110, the user will be notified 111 and may be approved for a smaller amount 112; but if not, the user will be notified as such (see display 113 and, also, FIG. 5B at 160). Screen 115 instructs the user to sign 116 the optical pad to acknowledge and affirm terms of a disclosure document (sample documents are shown at 24 in FIG. 1 and 224 in FIG. 4A). See also the preferred process flow diagrams in FIGS. 5B and 6B at 172 and 284, respectively. Screen 118 instructs the user to affirm (119) his/her/its unconditional promise to pay the amount stated by way of a draft (see also FIG. 1 at 19 and FIG. 5B at 164), which is equal to the requested amount 106 plus a transaction fee (usually, due to the financial risk involved, the fee is a percentage of the principal amount requested). The draft item is scanned by the user and transmitted to processor 40 for extraction of certain information therefrom, which is subsequently forwarded to a $3^{rd}$ party 120 for operation of the second tier of authorization. If not approved 121, then the requester is notified by screen 122. If approved, results are transmitted back through processor 40 and to the user via interface 14, plus a scrip or other article may be printed/output 124. As explained in connection with FIG. 1, the user can, thereafter, cash-in the scrip. Finally, step 126 (see, also, FIG. 5B at 180, 182 and FIG. 6B at 288, 289) the requestor ultimately must pay the stated, promised sum total (equal to the requested, or a lesser, amount plus the transaction fee).

The user interface of computerized apparatus 200, FIG. 3A, has a display screen 214, card reader 216, a signature capture pad 220, output/printer device 222 and electronic pen/wand 221. The close up view in FIG. 3B illustrates screen 214 having a visual keypad 202, an active area for real-time display 204 of input entered by a requester or input entered by an outlet/establishment clerk who is using the apparatus at the end of the day to request reimbursed fund transfer from entity-processor 40 (FIG. 1), a second, active area of display 206 for communicating responses from processor 40 such as a denial of authorization, as well as CANCEL and CONTINUE visual buttons 208, 210. FIGS. 4A and 4B are examples of a disclosure statement 224 and scrip 223, respectively.

Figure 6A:
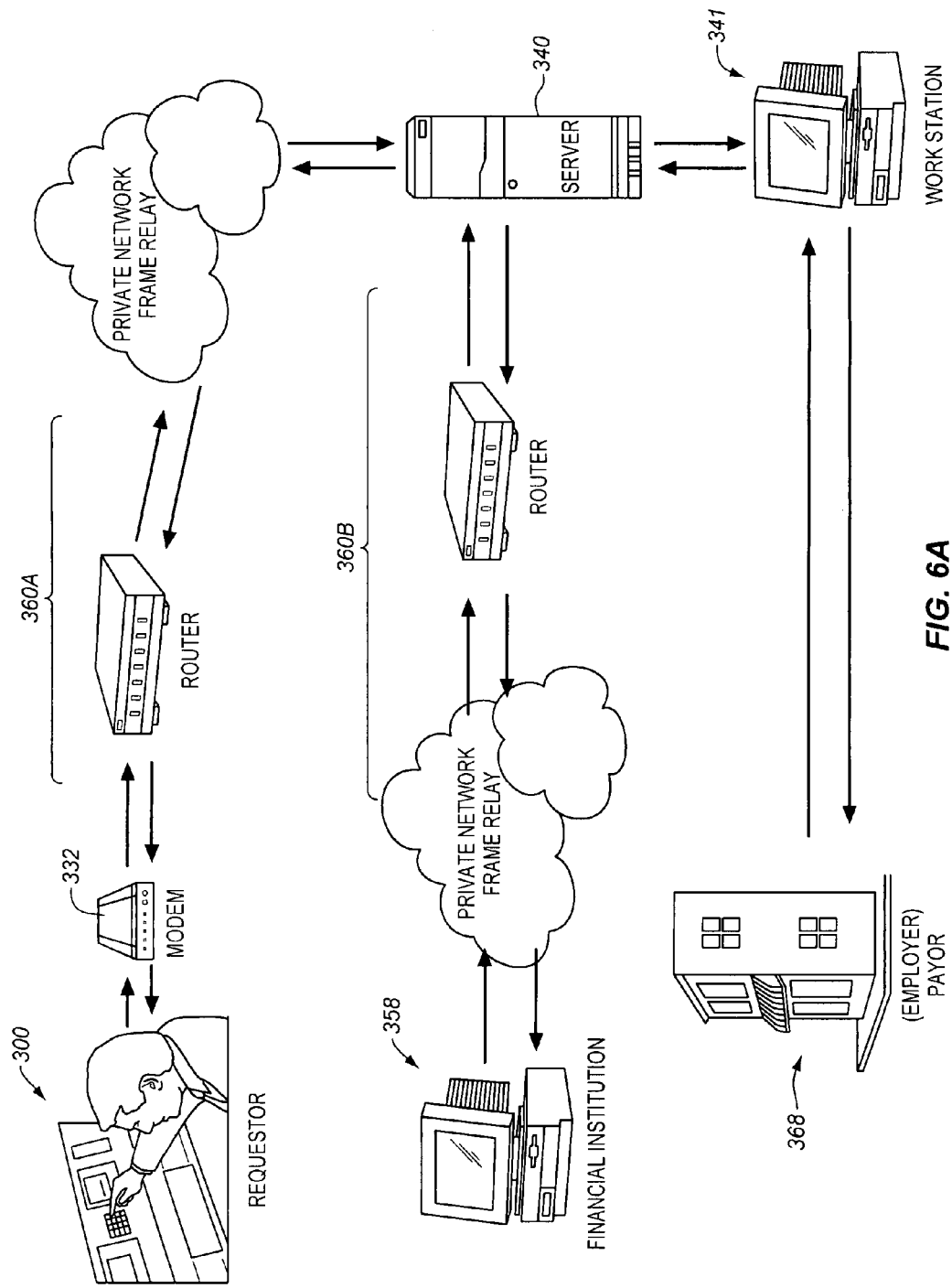
FIG. 6A diagrammatically illustrates certain hardware feature details and interconnection of components of a system of the invention, wherein authorization of present receipt of tender is sought in connection with an arrangement in effect between a payor and the requester.

FIGS. 5A and 6A have several common features: a requestor at apparatus 300 communicates through modem 332 and private data transfer pathway 360A to server 340. Server 340 and financial institution/check clearing house 358 communicate via private pathway 360B. In FIG. 5A client workstation 341 communicates with $3^{rd}$ party payment guarantor 350 via data transfer pathway 360C. Likewise in FIG. 6A, client workstation 341 communicates with Payor (such as an employer) 368 via the Internet.

Figure 6B:
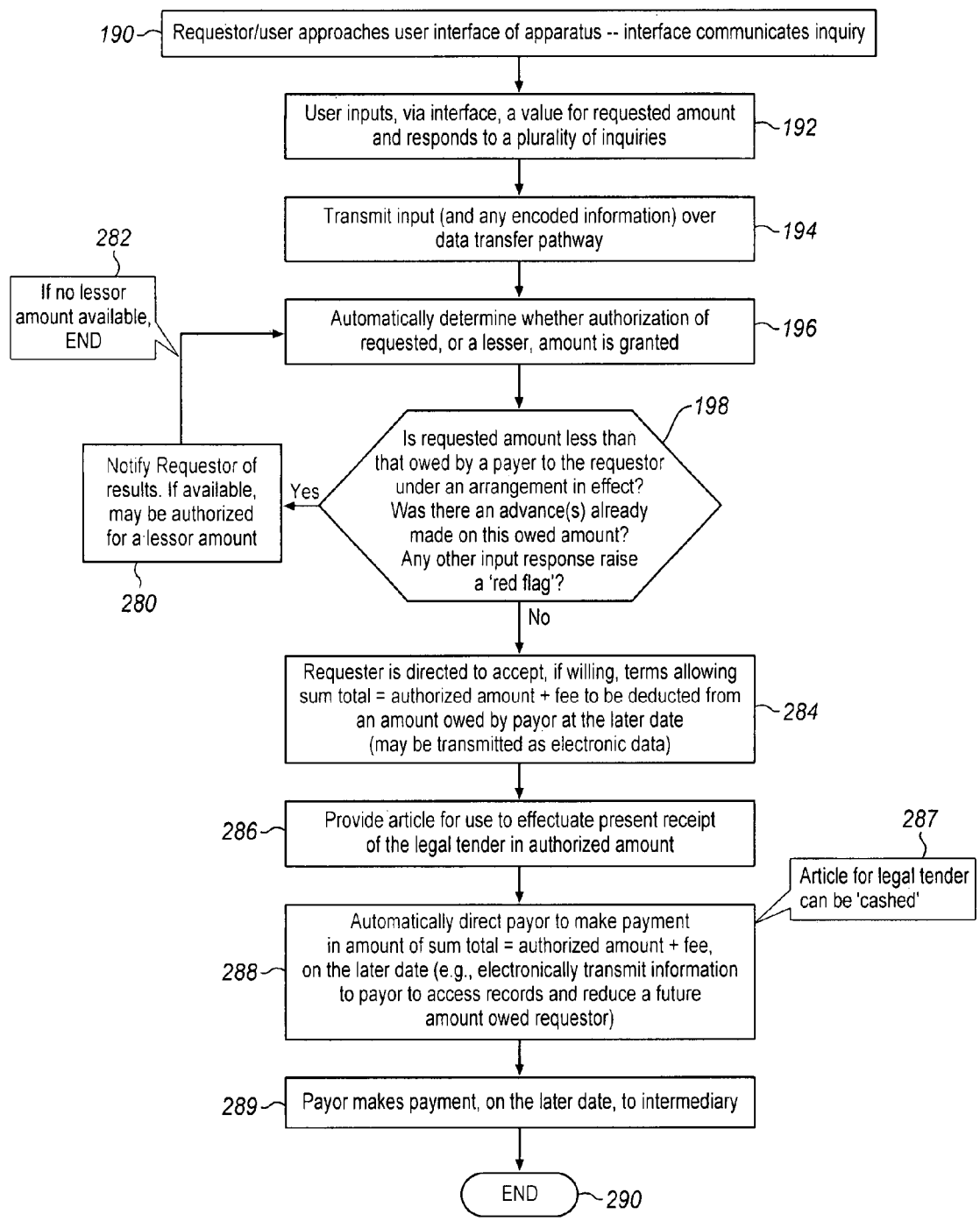
FIG. 6B is a flow diagram of process features associated with the system shown in FIG. 6A.
Figure 7:
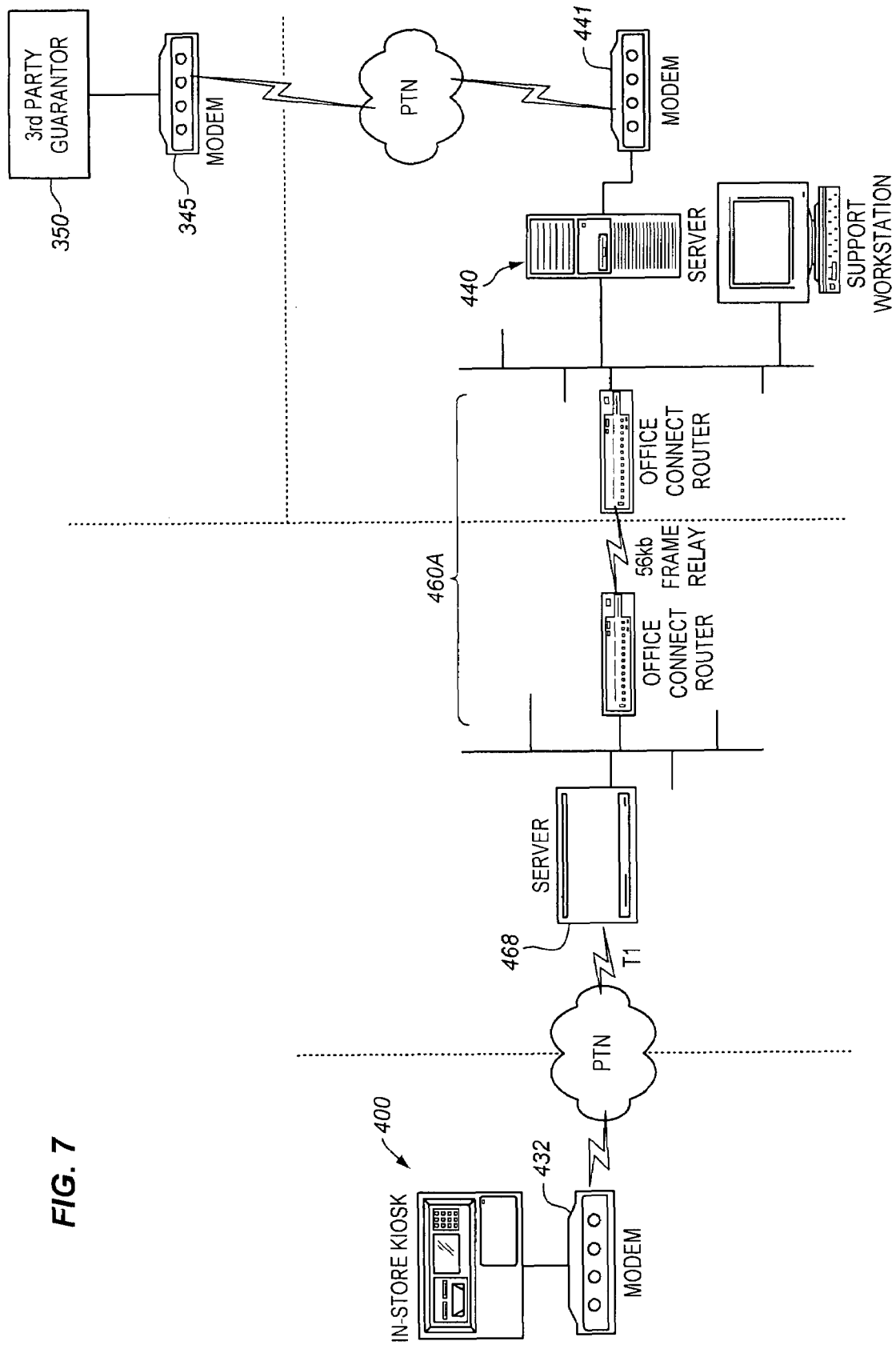
FIG. 7 includes details of interconnection illustrating features that further distinguish the system and process of the invention from known designs and manual techniques.

FIGS. 5B and 6B, which respectively correspond to schematic system drawings of FIGS. 5A and 6A, sufficiently detail the novel features of alternative preferred processes of the invention as labeled. These straightforward flow diagrams are readily understood in connection with the other figures, description provided herein, and claims.

By way of further example only in connection with the following paragraphs, apparatus 400 and the bank of modems at 468 are interconnected remote processor 440 via data transfer pathway 460A. Modem 441 is interconnected to 3$^{rd}$ party guarantor 350 and its modem 345 via private network (PTN).

I. Digital Computing. The apparatus and process of the invention are preferably carried out by incorporating a digital computer processing unit (e.g., that at 12 in FIG. 1) linked by a communication network, or bus 30, to both an input device (such as a touch-screen, a simple keypad with keys/buttons pre-programmed, or any other suitable mechanism) used to communicate a user's transaction request, and an internal memory-storage device (and, perhaps an external memory). The digital CPU is not the only computing processor suitable for use, however. By way of background, as is known, central processing unit (CPU) chips and microprocessors have four functional sections: (1) the arithmetic/logic unit, (2) temporary storage locations, called registers, which hold data, instructions, or the results of calculations; (3) the control section, which times and regulates all elements of the computer system and also translates patterns in the registers into computer activities; and (4) the internal bus, a network of communication lines that links internal CPU elements and offers several different data paths for input from and output to other elements of the computer system. Input devices let users enter commands, data, or programs for processing by the CPU. Many types of input devices are available: keyboards or specialized keypads, a mouse (a mechanical or optomechanical device with buttons and a rolling ball); joysticks and trackballs; light pens; touch-sensitive display screens (allow users to point to items or areas on a screen to activate commands); and voice-recognition circuitry exists that digitizes spoken words.

II. Digital Computer Data Storage and Operation background. Most digital computers store data both internally, in what is called main memory, and externally, on auxiliary storage units. As a computer processes data and instructions, it temporarily stores information internally, usually on silicon random-access memory, or RAM. Another type of internal memory consists of a series of read-only memory, or ROM, chips. The patterns on ROM chips correspond to commands and programs that the computer needs in order to boot up, or ready itself for operation, and to carry out basic operations. Other devices that can be used for main memory are magnetic-core memory and magnetic-bubble memory. Four often used auxiliary storage devices—floppy disks, hard disks, magnetic tape, and magnetic drums—store data by magnetically rearranging metal particles on disks, tape, or drums. A bitmap is a binary representation in which a bit or set of bits corresponds to some part of an object such as an image or font. A reader is machine that captures data for the computer, such as an optical character reader, magnetic card reader, magnetic strip reader, punched card reader, and microfiche/microfilm reader (the latter being a self_contained machine that reads film and displays its contents). A LAN (Local Area Network) is a communications network that serves users within a confined geographical area, contained in a building or complex, and so on; whereas a WAN (Wide Area Network) is a communications network that covers a wider geographic area, such as state or country.

While certain representative embodiments and details have been shown merely for the purpose of illustration and those skilled in the art will readily appreciate that various modifications may be made without departing from the novel teachings or scope of this disclosure. Accordingly, all such modifications are intended to be included within the scope as defined in the following claims. Although the commonly employed preamble phrase "comprising the steps of" may be used herein, or hereafter, in a method claim, the Applicants in no way intends to invoke 35 U.S.C. section 112 ¶6. Furthermore, in any claim filed herewith or that is filed hereafter, any means-plus-function clauses used, or later found to be present, are intended to cover the structures described herein as performing the recited function and not only structural equivalents but also equivalent structures.

What is claimed is:

1. A process for using a computerized apparatus to seek authorization from an intermediary for present receipt of legal tender in a requested amount, comprising the steps of:

reading encoded information from an identification item about a requestor;

receiving an input entered through a user interface in communication with said computerized apparatus, said input to comprise a value for the requested amount, said value being less than an amount due said requestor at a later date from a payor;

said requestor being an agent of said payor, said amount due is according to an arrangement in effect between said agent and said payor giving rise to said payor's obligation to pay said amount due not until said later date;

transmitting said encoded information and said input over a data transfer pathway to a remote processor;

automatically determining, without manual intervention, whether authorization of the requested amount or a lesser amount is granted;

said step of automatically determining comprises analyzing said input to calculate a score, and if said score is less than a minimum value, denying said authorization; and if said authorization is so granted, automatically providing, by outputting without manual intervention, an article for use to effectuate the present receipt of the legal tender in an authorized amount.

2. The process of claim 1 further comprising the step of, if said authorization is so granted, transmitting information to said payor directing that a payment be made on said later date of a sum total equal to at least said authorized amount plus a fee.

3. The process of claim 1 wherein: said encoded information comprises printed identification information about said requestor; said input comprises a personal identifier; and said step of automatically determining comprises the step of comparing, using said remote processor, said encoded information and said input.

4. The process of claim 1 wherein said arrangement in effect between said agent and payor is selected from the group consisting of an employment arrangement, a subcontractor arrangement, a contract for services, a royalty arrangement and a commission arrangement; and further comprising the step of, if said authorization is so granted, transmitting information electronically to said payor directing that a payment be made on said later date of a sum total equal to at least said authorized amount plus a fee.

5. The process of claim 1 wherein: said step of automatically determining comprises the step of comparing said encoded information and said input and accessing records to determine said amount due said requester at said later date; and prior to said step of automatically providing said article, further comprising the step of receiving an acceptance from said requester entered through said user interface, to a plurality of terms.

6. The process of claim 1 wherein said input is manually entered by said requestor; said automatically providing is performed by outputting to said requester while at said computerized apparatus; and said article is selected from the group consisting of a script, an encoded card, a money order, a traveler's check, and currency.

7. The process of claim 6 wherein said arrangement in effect between said agent and payor is selected from the group consisting of an employment arrangement, a subcontractor arrangement, a contract for services, a royalty arrangement, and a commission arrangement; and said article is said currency having been made electronically.

8. The process of claim 1 wherein said input is manually entered by a user who is not said requestor; said automatically providing is performed by outputting to said user while at said computerized apparatus; and said article is selected from the group consisting of a script, an encoded card, a money order, a traveler's check, and currency.

9. The process of claim 1 further comprising the step of:
if said authorization is so granted, on said later date, automatically directing that a debit equal to said amount due said requester be made from said payor, and transmitting data identifying said amount due from said payor to a clearing house capable of making an electronic payment.

10. A system for seeking automatic authorization from an intermediary for present receipt of legal tender in a requested amount, comprising:
a reader for reading encoded information from an identification item about a requestor and a user interface of a computerized apparatus for entering an input comprising a value for the requested amount, said value being less than an amount due said requestor at a later date from a payor;
said requestor being an agent of said payor, said amount due is according to an arrangement in effect between said agent and said payor giving rise to said payor's obligation to pay said amount due not until said later date;
said reader and said user interface in communication with a data transfer pathway and a remote processor;
said data transfer pathway for transmitting said input and said encoded information to said remote processor for comparison to determine, without manual intervention, whether authorization of the requested amount, or a lesser amount, is granted by analyzing said input to calculate a score, and if said score is less than a minimum value, denying said authorization; and
a mechanism for providing, by outputting without manual intervention, an article for use to effectuate the present receipt of the legal tender in said authorized amount, in the event said authorization is so granted.

11. The system of claim 10 wherein said remote processor is in further communication with said payor and, in the event said authorization is so granted, said remote processor to automatically transmit information to said payor directing that a payment be made on said later date of a sum total equal to at least said authorized amount plus a fee.

12. The system of claim 10 wherein said remote processor is in further communication with said payor and, in the event said authorization is so granted, said remote processor to automatically, on said later date, direct that a debit equal to said amount due said requestor be made from said payor through a clearing house capable of making an electronic payment.

13. The system of claim 10 wherein said remote processor comprises a plurality of interconnected servers; said identification item comprises a card; said encoded information comprises a magnetic strip having identification information about said requestor; said user interface further adapted for receiving an acceptance from said requestor, to a plurality of terms prior to said providing, without manual intervention, said article; and said arrangement in effect between said agent and payor is selected from the group consisting of an employment arrangement, a subcontractor arrangement, a contract for services, a royalty arrangement, and a commission arrangement.

14. The system of claim 10 wherein said reader comprises an magnetic strip reader; said user interface comprises a signature capture pad and a touch-sensitive display having an image of a keypad and once prompted, at least one written inquiry, the response to which becomes part of said input; and said mechanism for providing an article comprises a printing device, an outlet, and a document feeder.

15. A computer readable storage medium having stored thereon, program code for seeking authorization from an intermediary for present receipt of legal tender in a requested amount, the program code comprising:
a first program sub-code for reading encoded information from an identification item and for receiving an input entered through a user interface of a computerized apparatus, said input to comprise a value for the requested amount, said value being less than an amount due a requestor at a later date from a payor, said requestor being an agent of said payor, said amount due is according to an arrangement in effect between said agent and said payor giving rise to said payor's obligation to pay said amount due not until said later date;
a second program sub-code for transmitting said encoded information and said input over a data transfer pathway to a remote processor; and
a third program sub-code for automatically determining, without manual intervention, whether authorization of the requested amount, or a lesser amount, is granted; said automatically determining to comprise analyzing said input to calculate a score, and if said score is less than a minimum value, denying said authorization; and if said authorization is so granted, automatically providing, by outputting without manual intervention, an article for use to effectuate the present receipt of the legal tender in an authorized amount.

16. The program code of claim 15 wherein said third program sub-code further comprises instructions for transmitting information to said payor directing that a payment be made, if said authorization is so granted, on said later date of a sum total equal to at least said authorized amount plus a fee; said first program sub-code further comprises instructions for receiving an acceptance from said requestor, to a plurality of terms prior to said providing, without manual intervention, said article; and said arrangement in effect between said agent and payor is selected from the group consisting of an employment arrangement, a subcontractor arrangement, a contract for services, a royalty arrangement, and a commission arrangement.

17. The program code of claim 15 wherein said third program sub-code further comprises instructions for, in the event said authorization is so granted, automatically directing, on said later date, that a debit equal to said amount due said requestor be made from said payor through a clearing house capable of making an electronic payment.

18. The program code of claim 15 wherein said first program sub-code further comprises instructions for receiving said input manually entered by said requestor; said third program sub-code further comprises instructions for said automatically providing to include outputting to said requestor while at said computerized apparatus; and said article is selected from the group consisting of a script, an encoded card, a money order, a traveler's check, and currency.

19. The program code of claim 15 wherein said first program sub-code further comprises instructions for receiving said input manually entered by a user who is not said requestor; and said arrangement in effect between said agent and payor is selected from the group consisting of an employment arrangement, a subcontractor arrangement, a contract for services, a royalty arrangement, and a commission arrangement.

\* \* \* \* \*

UNITED STATES PATENT AND TRADEMARK OFFICE
CERTIFICATE OF CORRECTION

PATENT NO.       : 7,555,450 B2                                    Page 1 of 1
APPLICATION NO.  : 11/712286
DATED            : June 30, 2009
INVENTOR(S)      : Lanham et al.

It is certified that error appears in the above-identified patent and that said Letters Patent is hereby corrected as shown below:

Title page, item (63) "Related U.S. Application Data" is missing. After item (65) "Prior Publication Data US 2007/0156577 A1   Jul. 5, 2007" add a reference to the parent patent as supported by Office records:

-- Related U.S. Application Data
"Continuation of application No. 09/587,400, filed on June 5, 2000, now Pat. No. 7,191,149. --

Col. 1, line 5, after "Ser. No. 09/587,400" add -- , now U.S. Pat. No. 7,191,149, --

Signed and Sealed this

Eighth Day of September, 2009

David J. Kappos
*Director of the United States Patent and Trademark Office*